US011403277B2

(12) United States Patent
Mertens

(10) Patent No.: US 11,403,277 B2
(45) Date of Patent: *Aug. 2, 2022

(54) INTEGRATION OF INDEPENDENT PLATFORMS

(71) Applicant: Sentry Insurance Company, Stevens Point, WI (US)

(72) Inventor: James Mertens, Stevens Point, WI (US)

(73) Assignee: Sentry Insurance Company, Stevens Point, WI (US)

( * ) Notice: Subject to any disclaimer, the term of this patent is extended or adjusted under 35 U.S.C. 154(b) by 228 days.

This patent is subject to a terminal disclaimer.

(21) Appl. No.: 16/931,761

(22) Filed: Jul. 17, 2020

(65) Prior Publication Data

US 2020/0349143 A1   Nov. 5, 2020

Related U.S. Application Data

(63) Continuation of application No. 16/222,728, filed on Dec. 17, 2018, now Pat. No. 10,733,170, which is a (Continued)

(51) Int. Cl.
*G06F 16/23* (2019.01)
*G06F 8/40* (2018.01)
(Continued)

(52) U.S. Cl.
CPC ............ *G06F 16/2322* (2019.01); *G06F 8/40* (2013.01); *G06F 16/2477* (2019.01); *G06F 16/258* (2019.01); *G06F 16/90335* (2019.01)

(58) Field of Classification Search
CPC ...... G06F 8/40; G06F 16/258; G06F 16/2322; G06F 16/2477; G06F 16/90335
See application file for complete search history.

(56) References Cited

U.S. PATENT DOCUMENTS 6,031,993 A   2/2000 Andrews et al.
6,611,844 B1  8/2003 Saulpaugh et al.
(Continued)

FOREIGN PATENT DOCUMENTS

CN   1744120 B   9/2013

OTHER PUBLICATIONS

Cohen et al., "Automatic Program Transformation with JOIE", Jun. 1998, USENIX (Year: 1998).*
(Continued)

*Primary Examiner* — Wei Y Zhen
*Assistant Examiner* — Junchun Wu
(74) *Attorney, Agent, or Firm* — Foley & Lardner LLP

(57) ABSTRACT

A system includes a first computing device, a second computing device, and a third computing device. The first computing device is configured to identify a first event and store a first event code, a plurality of first entry codes, and first information associated with each of the plurality of entry codes. The second computing device is configured to derive a plurality of first translated event codes based on the first event code and a plurality of first translated entry codes for each of the plurality of first entry codes. The second computing device is further configured to determine whether the plurality of first entry codes were successfully derived. The third computing device is configured to read the first journal entry of the second database and determine, based on the indication that the plurality of first translated entry codes were successfully derived, to perform a first task.

18 Claims, 3 Drawing Sheets

Related U.S. Application Data continuation of application No. 15/596,169, filed on May 16, 2017, now Pat. No. 10,157,197, which is a continuation of application No. 14/934,906, filed on Nov. 6, 2015, now Pat. No. 9,658,837.

(51) Int. Cl.
*G06F 16/25* (2019.01)
*G06F 16/2458* (2019.01)
*G06F 16/903* (2019.01)

(56) References Cited

U.S. PATENT DOCUMENTS

| | | | |
|---|---|---|---|
| 7,617,494 B2 | 11/2009 | Rovati et al. | |
| 7,668,632 B2 | 2/2010 | Vian et al. | |
| 7,844,958 B2 | 11/2010 | Colton et al. | |
| 8,316,046 B2 | 11/2012 | Huang et al. | |
| 8,572,063 B2 | 10/2013 | Plattner et al. | |
| 8,717,461 B2 | 5/2014 | Gallagher et al. | |
| 8,788,585 B2 | 7/2014 | Mcbrearty | |
| 9,043,355 B1 | 5/2015 | Kapoor et al. | |
| 9,213,983 B2 | 12/2015 | Martin et al. | |
| 9,244,856 B2* | 1/2016 | Greiner | G06F 12/1009 |
| 9,256,546 B2* | 2/2016 | Gschwind | G06F 9/45558 |
| 9,311,259 B2* | 4/2016 | Greiner | G06F 9/466 |
| 9,489,229 B2* | 11/2016 | Gschwind | G06F 9/45558 |
| 10,650,051 B2* | 5/2020 | Alekseyev | H04L 43/16 |
| 11,061,908 B2* | 7/2021 | Kemp | G06F 16/9535 |
| 11,074,180 B2* | 7/2021 | Greiner | G06F 12/1009 |
| 2002/0095663 A1* | 7/2002 | Joory | G06F 16/27 717/136 |
| 2002/0152457 A1 | 10/2002 | Jahnke | |
| 2003/0056204 A1* | 3/2003 | Broussard | G06F 8/38 717/140 |
| 2005/0132340 A1* | 6/2005 | Houghton | G06F 16/84 717/136 |
| 2005/0273772 A1* | 12/2005 | Matsakis | G06F 8/41 717/136 |
| 2006/0168574 A1* | 7/2006 | Giannini | H04L 67/10 717/168 |
| 2008/0189689 A1* | 8/2008 | Tramontana | G06F 9/44589 717/143 |
| 2010/0153929 A1 | 6/2010 | Porras et al. | |
| 2011/0252057 A1* | 10/2011 | Huang | G06Q 40/00 707/E17.014 |
| 2013/0263091 A1* | 10/2013 | Neogi | G06F 9/5061 717/126 |
| 2013/0311483 A1* | 11/2013 | Patel | G16Z 99/00 707/E17.014 |
| 2015/0278105 A1* | 10/2015 | Gschwind | G06F 9/3824 711/202 |
| 2016/0070637 A1* | 3/2016 | Furtwangler | G06F 11/3644 717/126 |
| 2016/0366160 A1* | 12/2016 | Kapoor | G06F 16/2358 |
| 2017/0322682 A1* | 11/2017 | Humayun | G16H 40/20 |

OTHER PUBLICATIONS

Engel et al., "A Basic Model for Proactive Event-Driven Computing", Jul. 2012, ACM (Year: 2012).*
Huang et al., "Platform-Independent Model Templates for Business Process Integration and Management Solutions", 2003, IEEE (Year: 2003).*
Holzmann et al., "A Practical Method for Verifying Event-Driven Software", 1999, ACM (Year: 1999).*
Foster et al., "Chimera: A Virtual Data System for Representing, Querying, and Automating Data Derivation," IEEE, 2002, 10 pages.
Mosterman et al., "Computer Automated Multiparadigm Modeling in Control Systems Technology," Mar. 2004, IEEE vol. 12, No. 2, pp. 223-234.
Notice of Allowance in U.S. Appl. No. 15/596,169, dated Aug. 14, 2018.
Notice of Allowance in U.S. Appl. No. 16/222,728, dated May 1, 2020.
Notice of Allowance on U.S. Appl. No. 14/934,906, dated Mar. 29, 2017.
Schmidt et al., "The Enterprise Service Bus: Making service-oriented architecture real," 2005, IBM Systems Journal, vol. 44, No. 4, 17 pages.
Tan et al., "Software Architectural Transformations," 2003, Kluwer Academic Publishers, pp. 467-484.

* cited by examiner

INTEGRATION OF INDEPENDENT PLATFORMS

CROSS REFERENCE TO RELATED APPLICATIONS

This application is a continuation of U.S. patent application Ser. No. 16/222,728, filed on Dec. 17, 2018 (now U.S. Pat. No. 10,733,170), which is a continuation of U.S. patent application Ser. No. 15/596,169, filed on May 16, 2017 (now U.S. Pat. No. 10,157,197), which is a continuation of U.S. patent application Ser. No. 14/934,906, filed on Nov. 6, 2015 (now U.S. Pat. No. 9,658,837), which are each incorporated herein by reference in their entireties.

TECHNICAL FIELD

The present disclosure relates, in general, to integrating independent platforms. More particularly, the present disclosure relates to facilitating communication between independent platforms.

BACKGROUND

The following description is provided to assist the understanding of the reader. None of the information provided or references cited is admitted to be prior art. Many companies and organizations have multiple independent systems that are used to provide a service to customers. However, the independent systems may not use the same codes to indicate various information fields. Thus, facilitating information between the independent systems can be complex and difficult to maintain.

SUMMARY

An illustrative system includes a first computing device, a second computing device, and a third computing device. The first computing device is configured to identify a first event and store in a first database a first event code, a plurality of first entry codes, and first information associated with each of the plurality of entry codes. The second computing device is configured to read the first event code and the plurality of first entry codes from the first database, derive a plurality of first translated event codes based on the first event code, and derive a plurality of first translated entry codes for each of the plurality of first entry codes. The second computing device is further configured to determine whether the plurality of first entry codes were successfully derived and store in a first journal entry of a second database the first event code, the plurality of first translated event codes, the plurality of first entry codes, the plurality of translated first entry codes, and an indication that the plurality of first translated entry codes were successfully derived. The third computing device is configured to perform, in response to the first event occurring, a first task using one of the plurality of first translated event codes and one of the plurality of first translated entry codes for each of the plurality of first entry codes. The third computing device is further configured to read the first journal entry of the second database and determine, based on the indication that the plurality of first translated entry codes were successfully derived, to perform the first task.

An illustrative computing device includes a transceiver configured to receive, from a first database, a first event code, a plurality of first entry codes, and first information associated with each of the plurality of entry codes. The first database, the first event code, the plurality of first entry codes, and the first information are associated with a first event. The computing device further includes memory configured to store the first event code, the plurality of first entry codes, and the first information associated with each of the plurality of entry codes. The computing device also includes a processor operatively coupled to the transceiver and the memory. The computing device is configured to derive a plurality of first translated event codes based on the first event code and to derive a plurality of first translated entry codes for each of the plurality of first entry codes. The computing device is further configured to determine whether the plurality of first entry codes were successfully derived and to store in a first journal entry of a second database the first event code, the plurality of first translated event codes, the plurality of first entry codes, the plurality of translated first entry codes, and an indication that the plurality of first translated entry codes were successfully derived.

A illustrative non-transitory computer-readable medium has computer-readable instructions stored thereon that, upon execution by a processor, cause a device to perform operations. The instructions include instructions to receive, from a first database, a first event code, a plurality of first entry codes, and first information associated with each of the plurality of entry codes. The first database, the first event code, the plurality of first entry codes, and the first information are associated with a first event. The instructions also include instructions to derive a plurality of first translated event codes based on the first event code and instructions to derive a plurality of first translated entry codes for each of the plurality of first entry codes. The instructions further include instructions to determine whether the plurality of first entry codes were successfully derived and instructions to store in a first journal entry of a second database the first event code, the plurality of first translated event codes, the plurality of first entry codes, the plurality of translated first entry codes, and an indication that the plurality of first translated entry codes were successfully derived.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
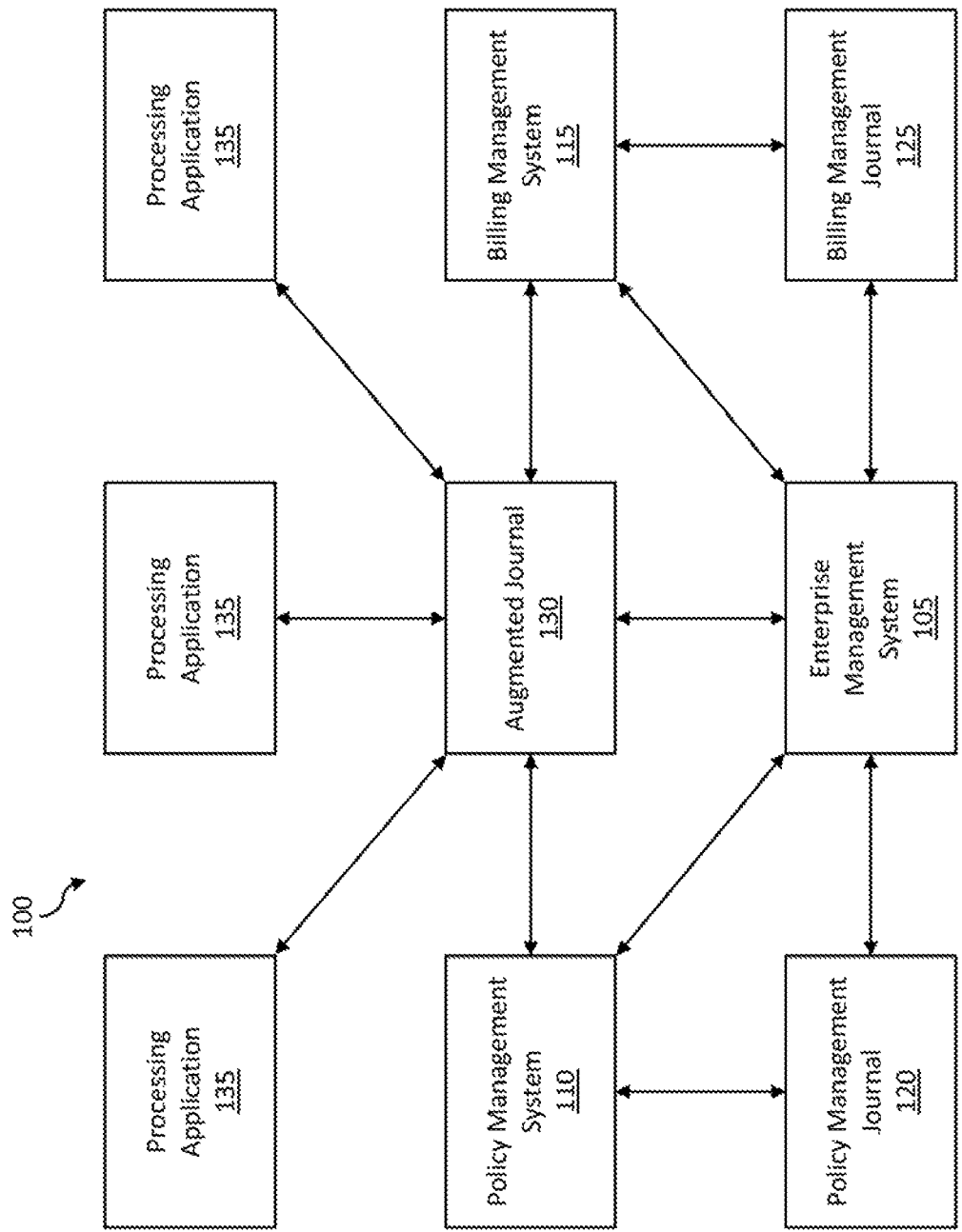
FIG. 1 is a block diagram of a processing system in accordance with an illustrative embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Many organizations have multiple computer networks or systems that work in concert to provide a service to customers. Oftentimes, organizations automate or computerize multiple specific tasks using a discrete program or computer system for each task. For example, as computers and computer programs become more advanced, organizations are automating more advanced tasks. Over time, an organization can accumulate multiple individual systems to provide a service to their customers.

In many instances, the individual systems were each originally designed to operate under certain parameters, but the operating environment may change over time. Accordingly, the individual systems can be modified to more effectively perform their respective tasks in the new environments under new parameters. For example, a computer program may have originally been designed to perform a task for a management system, but the computer program may later be adapted to perform the task for other systems. In many instances, the individual systems and programs become more entangled with each other and dependent on one another over time.

In some cases, an organization purchases a product from a third party to perform a specific task. However, the product may not be directly compatible with multiple other computer systems of the organization. For example, the product from the third party may use different ciphers, cryptographs, codes, etc. to process information than is used by the existing organization's computer systems.

Thus, effectively facilitating proper communication between an organization's computer systems and programs can become difficult and complex over time as the organization adapts to advancing technology. For example, each time that a new application is added to a network of systems or each time that a new information sharing communication connection is made between applications, the individual affected applications can each be edited to decipher, translate, or otherwise process data from the new application or connection. However, reprogramming each application is time consuming, inefficient, and can lead to mistakes that can cost the organization significant amounts of money. Various embodiments described herein address one or more of such problems.

FIG. 1 is a block diagram of a processing system in accordance with an illustrative embodiment. An illustrative processing system 100 includes an enterprise management system 105, a policy management system 110, a billing management system 115, a policy management journal 120, a billing management journal 125, an augmented journal 130, and multiple processing applications 135. In alternative embodiments, additional, fewer, and/or different elements may be used. For example, various embodiments and examples described herein relate to an insurance company. However, the disclosure is not meant to be limited to insurance companies but can be easily adapted for use in any suitable system.

The various elements illustrated in FIG. 1 can communicate with one another using any suitable communication protocol. For example, some elements may communicate using a unique communication protocol. Communication between the elements can be wired or wireless. The communication can be via one or more networks, such as a local area network (LAN), a wide area network (WAN), direct communications, the Internet, etc.

The processing system 100 can be used to provide services to customers. For example, in the context of an insurance company, the processing system 100 can be used to provide services related to insurance products. An illustrative policy management system 110 manages insurance policies and/or quotes for insurance policies. For example, the policy management system 110 can facilitate initiating a new policy, qualify potential policy holders, provide quotes, issue policies, maintain policies (e.g., report premiums, perform audits, etc.), facilitate changes to policies, renew policies, etc. The policy management system 110 can be any suitable computing system. Although the policy management system 110 is explained herein as relating to managing insurance policies, the policy management system 110 can be any suitable computing system for any other industry, sector, purpose, etc.

An illustrative billing management system 115 manages the billing functions of an organization. For example, the billing management system 115 can receive billing instructions (e.g., related to new or updated policies), create customer accounts, schedule payments, calculate and distribute commissions, calculate and issue invoices, process payments, close accounts (e.g., once all receivables have been cleared), etc. The billing management system 115 can be any suitable computing system. Although the billing management system 115 is explained herein as related to managing accounts of insurance policies, the billing management system 115 can be any computing system for any other industry, sector, purpose, etc. for each customer.

In an illustrative embodiment, each of the policy management system 110 and the billing management system 115 export event data to a journal. The policy management system 110 writes event data to the policy management journal 120, and the billing management system 115 writes event data to the billing management journal 125. The event data can be related to events that trigger other systems or applications to perform tasks, events that other systems or applications are dependent upon, etc. For example, some events can include charging a customer a late fee, binding an insurance policy, issuing an invoice, modifying a policy, etc. In alternative embodiments, the policy management system 110 and the billing management system 115 can each export events to multiple journals. For example, the policy management system 110 can export event data to a first journal related to bound policies and can export event data to a second journal related to policy quotes.

The policy management journal 120 and the billing management journal 125 can store information in any suitable format. For example, the policy management journal 120 and the billing management journal 125 can be databases that store information in the Extensible Markup Language (XML) format. In an illustrative embodiment, each entry of an event includes an indication of a time. For example, a timestamp can be included for each event indicating the time at which the event occurred. In an illustrative embodiment, the policy management journal 120 and/or the billing management journal 125 include events in chronological order.

In alternative embodiments, the policy management journal 120 and/or the billing management journal 125 store events according to importance.

In an illustrative embodiment, the enterprise management system 105 communicates with the policy management system 110, the policy management journal 120, the billing management system 115, and the billing management journal 125. In an illustrative embodiment, the policy management system 110 and the billing management system 115 can communicate to the enterprise management system 105 when an event has been written to the respective journal. In some embodiments, the policy management system 110 and the billing management system 115 can indicate to the enterprise management system 105 when information written to the respective journals should be processed by the enterprise management system 105. For example, after a predetermined amount of entries have been written to the policy management journal 120, the policy management system 110 communicates to the enterprise management system 105 an indication that the entries should be processed. In response to receiving the indication, the enterprise management system 105 can process the unprocessed entries in the policy management journal 120.

In an illustrative embodiment, the enterprise management system 105 reads the journal entries from the policy management journal 120 and the billing management journal 125. The journal entries include any suitable information. For example, each journal entry includes an event code that indicates what event occurred. In some embodiments, each journal entry includes information relevant to the event. For example, a journal entry can include an event code corresponding to a new policy having been bound, an entry code corresponding to the name of the insured, an entry code corresponding to the car covered by the policy, an entry code corresponding to the address of the insured, etc. The journal entry can include information associated with each of the entry codes. For example, an entry code corresponding to the name of the insured is followed by "Chet Manley," which is the name of the insured.

In an illustrative embodiment, the enterprise management system 105 translates the entries into formats usable by other systems or applications. Following the example above, the event code "934TXS" can be the event code in the policy management system policy management system 110 corresponding to a new policy having been issued, but the event code "DCHSS" can be used in the policy management journal 120 to indicate that a new policy has been bound. In an illustrative embodiment, the enterprise management system 105 reads the journal entry in the policy management journal 120, translates the event code from "934TXS" into "DCHSS," and writes a journal entry into the augmented journal 130. In an illustrative embodiment, the journal entry in the augmented journal 130 includes multiple event codes corresponding to multiple systems and applications. For example, each journal entry in the augmented journal 130 can include a translation of the event code into formats suitable for each of the policy management system 110, the billing management system 115, and each of the processing applications 135. Following the example above, the corresponding journal entry includes both entry codes "934TXS" and "DCHSS."

In some embodiments, each journal entry includes a translation of the event code for systems and applications dependent upon the event. For example, an invoice is issued by the billing management system 115. The billing management system 115 writes a journal entry to the billing management journal 125 with the code "SMA." The enterprise management system 105 reads the journal entry, and translates the code "SMA" into corresponding codes for each application and system that performs a function in response to an invoice being issued. In such an example, the enterprise management system 105 does not translate the code "SMA" into a corresponding code for the policy management system 110 because the policy management system 110 is unaffected by an invoice being issued. The enterprise management system 105 does translate the code "SMA" into a corresponding code "HJB" for use by one of the processing applications 135 that prints the invoice and posts the invoice in the mail.

In an illustrative embodiment, the journal entries of the augmented journal 130 are read by the policy management system 110, the billing management system 115, and/or the processing applications 135 and processed in successive order. For example, the augmented journal 130 can be a first in, first out (FIFO) type database. In an illustrative embodiment, various entries in the augmented journal 130 are maintained in a particular chronological order. In some embodiments, dependent events occur in the augmented journal 130 after independent events. For example, a journal entry for a policy having been bound is before an entry for the policy information being changed. In such an embodiment, if the entry for the policy information being changed is before the policy having been bound, the entry for the policy information being changed may be used by other applications before the entry for the policy having been bound is used. Such an occurrence can cause issues.

For example, the policy management system 110 binds a new policy with a new customer. The policy management system 110 writes the event and the relevant details to the policy management journal 120. The policy management system 110 receives an indication that the address of the policyholder was entered incorrectly in the initial binding of the policy. The policy management system 110 writes the event of a correction of the address of the policy holder to the policy management journal 120 in a new entry. The enterprise management system 105 reads the entries, converts the codes into corresponding codes for the billing management system 115, and writes new entries into the augmented journal 130. If the entries are out of chronological order (e.g., the address correction is before the policy being bound), an error can occur when the billing management system 115 attempts to correct the address of the policyholder within a database of the billing management system 115. That is, the billing management system 115 cannot correct an entry that does not exist. But, if the entries are in the proper order, the billing management system 115 first creates a new account based on the entry that a new policy has been bound, and then corrects the entry based on the journal entry indicating that the address of the policyholder was incorrect in the initial binding of the policy.

In an illustrative embodiment, the augmented journal 130 is accessible by various elements that perform functions in response to an event occurring. In some embodiments, multiple augmented journals 130 may be used. In an illustrative embodiment, each system or application that logs events in a journal can have an associated augmented journal 130. In an alternative embodiment, each system or application that reads events from a journal can have an associated augmented journal 130.

In an illustrative embodiment, the journal entries of the augmented journal 130 are maintained for a long enough period of time to correct mistakes after they are found (e.g., sixty days). For example, if an entry code was entered incorrectly or translated incorrectly, the processing applications 135 that rely on the entry codes process the journal entries with incorrect information. In an illustrative embodiment, once a mistake is identified, journal entries associated with the mistake (e.g., other journal entries related to the same policy) that have been processed are identified, and the mistakes are corrected.

Figure 2:
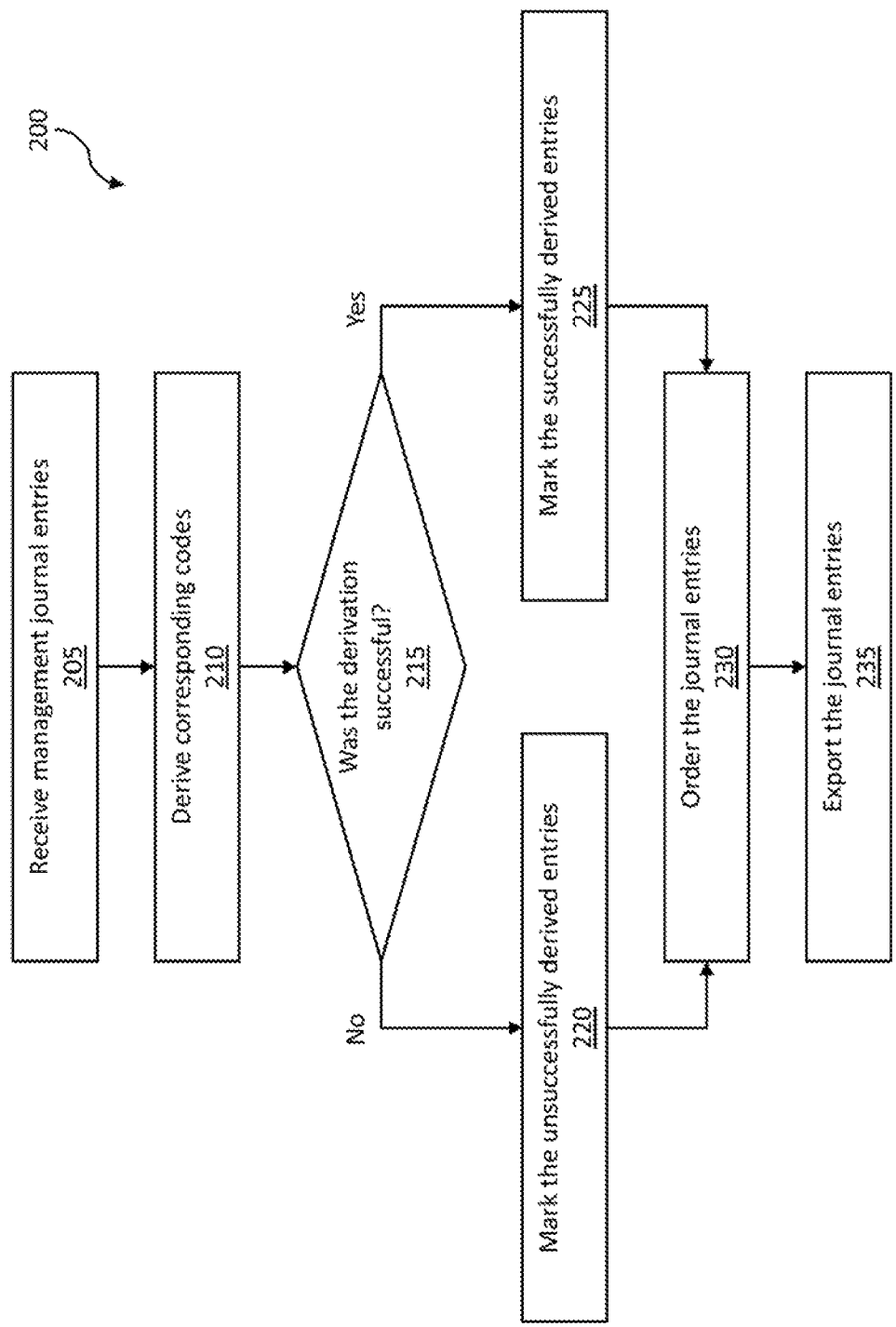
FIG. 2 is a flow diagram of a method for integrating platforms in accordance with an illustrative embodiment.

FIG. 2 is a flow diagram of a method for integrating platforms in accordance with an illustrative embodiment. In alternative embodiments, additional, fewer, and/or different operations may be performed. Also, the use of a flow diagram and arrows is not meant to be limiting with respect to the order or flow of operations. For example, one or more operations may be performed simultaneously.

In an operation 205, management journal entries are received. In alternative embodiments, any suitable entries can be received. In an illustrative example, the enterprise management system 105 receives journal entries from the policy management journal 120 and/or the billing management journal 125. In some embodiments, the operation 205 includes querying a database comprising the policy management journal 120 and/or the billing management journal 125. For example, the enterprise management system 105 can query a database of journal entries and receive, in response to the query, a list of events and related information since the last query. In an alternative embodiment, the policy management journal 120 and/or the billing management journal 125 transmit to the enterprise management system 105 the journal entries. For example, the policy management journal 120 and/or the billing management journal 125 can transmit journal entries as soon as the policy management journal 120 and/or the billing management journal 125 receive the journal entries. In another example, the policy management journal 120 and/or the billing management journal 125 transmit the journal entries on a regular basis to the enterprise management system 105. In yet another example, the policy management journal 120 and/or the billing management journal 125 transmit to the enterprise management system 105 the journal entries based on a trigger, such as an accumulation of a pre-determined amount of un-processed journal entries.

In an operation 210, corresponding codes are derived. In an illustrative embodiment, the received management journal entry includes an event code and one or more entry codes. Codes corresponding to the event code and the entry codes can be derived using any suitable method. For example, the enterprise management system 105 can receive a journal entry with an event code and entry codes corresponding to the policy management system 110. The enterprise management system 105 can use a look-up table to derive codes corresponding to the event code and the entry codes in the journal entry. The look-up table can include information identifying the relationship between codes used by various systems and applications of the processing system 100. The codes corresponding to the event code and the entry codes in the journal entry can be codes indicating the same information, but translated for use in other systems or applications, such as the billing management system 115 or the processing applications 135. In an illustrative embodiment, the corresponding codes are derived for each code of the received management journal entries.

In an alternative embodiment, the operation 210 includes querying the management system that exported the journal entry. For example, the enterprise management system 105 can receive a journal entry with an entry code from the policy management journal 120. The enterprise management system 105 can transmit the entry code to the policy management system 110 requesting a description of the entry code. For example, the entry code is "wDFO." The enterprise management system 105 can transmit to the policy management journal 120 the entry code of "wDFO" with a request for a description. The policy management journal 120 can transmit to the enterprise management system 105 an indication that "wDFO" corresponds to the name of the insured. The enterprise management system 105 can use a look-up table to determine the various corresponding codes that are related to the name of the insured.

In some embodiments, deriving corresponding codes includes determining related entries. In some instances, information included in one entry can be used to fill in related entries. For example, if an entry for a model of a car includes "CIVIC," the operation 210 includes determining that the make of the car is "HONDA." In such an example, all "CIVIC" model cars are also "HONDA" makes. In another example, an entry for a cell phone number of "123-123-1234" can be used to fill in an SMS text message phone number with "123-123-1234" because cell phone numbers are configured to receive SMS text messages.

In an operation 215, it is determined whether the derivation was successful. In an illustrative embodiment, for each of the entries, the enterprise management system 105 determines whether the corresponding codes were successfully derived. For example, if an entry code is found in the look-up table, it can be determined that the derivation was successful. If an entry code is not found in the look-up table, it can be determined that the derivation was not successful. For example, if an error was made entering the journal entry or receiving the journal entry, an entry code may not be found in the look-up table.

If it was determined that the derivation was unsuccessful, in an operation 220, the unsuccessfully derived entries are marked as such. If it was determined that the derivation was successful, in an operation 225, the successfully derived entries are marked as such. In an illustrative embodiment, a journal entry can be marked as having been successfully or unsuccessfully translated. In an alternative embodiment, the entry code that was or was not successfully translated is marked. Any suitable method of marking the entry or the entry code can be used. For example, a column, entry, etc. in the journal (e.g., the policy management journal 120, the billing management journal 125, and/or the augmented journal 130) can indicate whether the entry code was successfully derived.

In an illustrative embodiment, derivation errors can be resolved, for example, by a user. Once an error is resolved, a journal entry marked as having an entry code that was unsuccessfully derived can be marked as having the entry code that was successfully derived.

In an illustrative embodiment, journal entries that are marked as unsuccessfully derived are not processed by the systems or applications that read the journal entries from the augmented journal 130. For example, if the processing applications 135 receive a journal entry that indicates that there was an error in deriving the corresponding entry code for the respective processing application 135, the respective processing application 135 does not process the journal entry. For example, a journal entry may indicate that a new policy was bound, but the journal entry can indicate that one of the entry codes of the journal (e.g., an email address) was not translated properly. A processing application that emails a welcome package email message to the insured can read the journal entry, but not email the welcome package email message because of the indication that the entry code was not translated properly. Additionally, in some embodiments, journal entries that are dependent upon a journal entry that was not successfully translated are not processed by the processing applications 135. In an illustrative embodiment, if a journal entry associated with a policy was not successfully translated, the enterprise management system 105 prevents any other journal entry related to the same policy from being processed until the error is corrected, thereby ensuring that the journal entries for a particular policy are processed in chronological order.

In an illustrative embodiment, if an entry code was unsuccessfully derived, the enterprise management system 105 prevents other journal entries with the same entry code from being processed until the error is corrected. In some embodiments, the enterprise management system 105 identifies which entry codes were not successfully derived, and identifies related entry codes. In such embodiments, the enterprise management system 105 prevents the processing of the related entry codes. In some embodiments, the related entry codes are related entry codes specific to the same policy or account of the unsuccessfully derived entry code.

In an illustrative embodiment, if a journal entry is marked as unsuccessfully derived, the journal entry is augmented with additional information related to the unsuccessful derivation. For example, additional elements in the journal entry can be used to describe what about the derivation was unsuccessful. In some instances, the journal entry is marked with one or more codes that indicate reasons why the derivation was unsuccessful. In an illustrative embodiment, the entry codes that are not successfully derived are listed. In some embodiments, for each entry code that was not successfully derived, the journal is marked with one or more corresponding reasons for why the derivation was unsuccessful. Some example reasons for unsuccessful derivations include that an entry code was not found in a look-up table, that an entry code included unexpected characters (e.g., characters that do not conform to a standard), that an entry code included too many or too few characters, that a journal entry is corrupted, etc.

In an illustrative embodiment, dependent journal entries are not processed by the processing applications 135 until the independent journal entries are processed. In such embodiments, the processing applications 135 can work in parallel to process multiple journal entries once. However, as discussed above, issues can arise if dependent journal entries are processed before the independent journal entries. The processing applications 135 can check whether a journal entry is a dependent entry and, if so, whether the independent journal entry has already been processed.

In an operation 230, the journal entries are ordered. In an illustrative embodiment, the augmented journal 130 can be used as a first in, first out (FIFO) database in which entries are processed in the order in which they are in the database. For example, the processing applications 135 that process information based on entries in the augmented journal 130 can process the entries in the order in which they are in the database. Thus, in an illustrative embodiment, independent journal entries (e.g., binding a policy) should appear before entries that are dependent upon the independent journal entries (e.g., a revision to the bound policy). In an illustrative embodiment, the operation 230 includes ordering journal entries such that dependent entries appear after the independent entries that the dependent entries depend on. In some embodiments, all journal entries are ordered in chronological order.

In some embodiments, it may not be possible to order entries entirely upon when the events occurred. For example, one or more processes may be working in parallel, and one or more entries may correspond to events that occurred at the same time. In such embodiments, any suitable method of ordering entries can be used such that independent events appear before corresponding dependent events.

In an operation 235, journal entries are exported. In an illustrative embodiment, the journal entries that are augmented with the corresponding entry codes are written to a journal (e.g., the augmented journal 130). The exported journal entries can be exported in any suitable manner. For example, the journal entries can be exported to an XML database.

Figure 3:
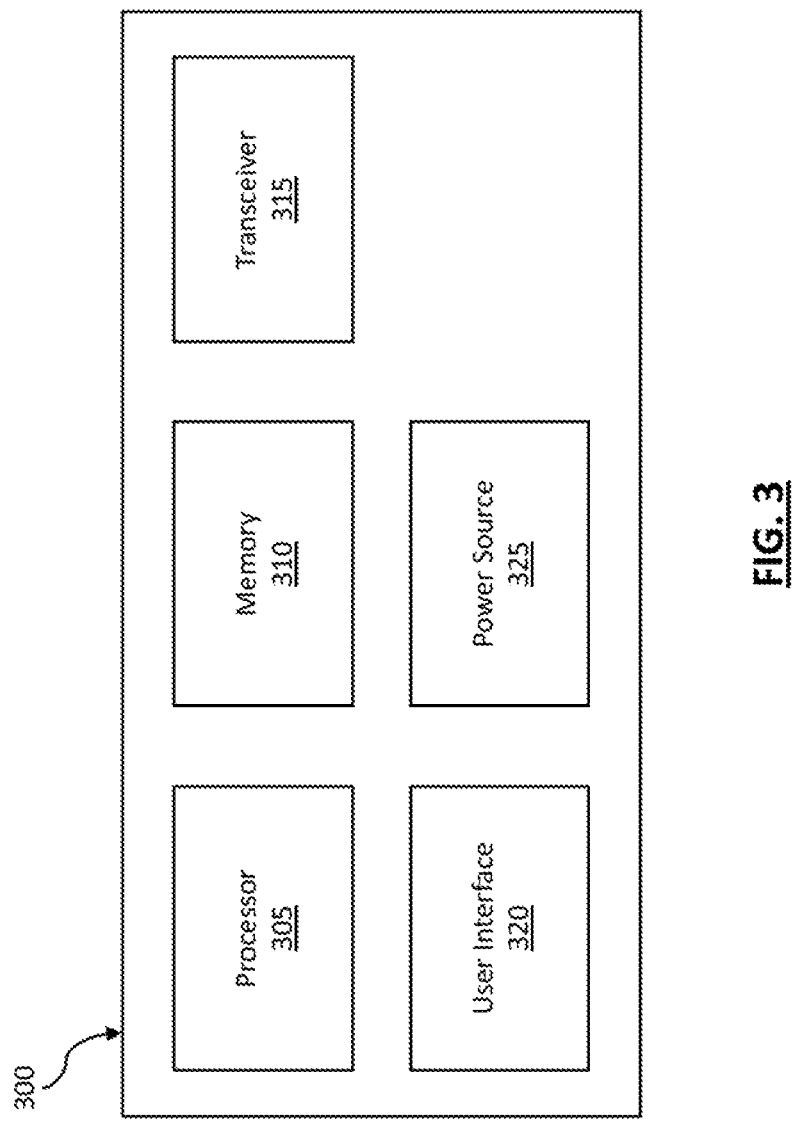
FIG. 3 is a block diagram of a computing device in accordance with an illustrative embodiment.

FIG. 3 is a block diagram of a computing device in accordance with an illustrative embodiment. An illustrative computing device 300 includes a memory 310, a processor 305, a transceiver 315, a user interface 320, and a power source 325. In alternative embodiments, additional, fewer, and/or different elements may be used. The computing device 300 can be any suitable device described herein. For example, the enterprise management system 105, the policy management system 110, and the enterprise management system 105 may each include one or more computing devices 300. The computing device 300 can be a desktop computer, a laptop computer, a smartphone, a server, a specialized computing device, etc. The computing device 300 can be used to implement one or more of the methods described herein.

In an illustrative embodiment, the memory 310 is an electronic holding place or storage for information so that the information can be accessed by the processor 305. The memory 310 can include, but is not limited to, any type of random access memory (RAM), any type of read only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. The computing device 300 may have one or more computer-readable media that use the same or a different memory media technology. The computing device 300 may have one or more drives that support the loading of a memory medium such as a CD, a DVD, a flash memory card, etc.

In an illustrative embodiment, the processor 305 executes instructions. The instructions may be carried out by a special purpose computer, logic circuits, or hardware circuits. The processor 305 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 305 executes an instruction, meaning that it performs the operations called for by that instruction. The processor 305 operably couples with the user interface 320, the transceiver 315, the memory 310, etc. to receive, to send, and to process information and to control the operations of the computing device 300. The processor 305 may retrieve a set of instructions from a permanent memory device such as a ROM device and copy the instructions in an executable form to a temporary memory device that is generally some form of RAM. An illustrative computing device 300 may include a plurality of processors that use the same or a different processing technology. In an illustrative embodiment, the instructions may be stored in memory 310.

In an illustrative embodiment, the transceiver 315 is configured to receive and/or transmit information. In some embodiments, the transceiver 315 communicates information via a wired connection, such as an Ethernet connection, one or more twisted pair wires, coaxial cables, fiber optic cables, etc. In some embodiments, the transceiver 315 communicates information via a wireless connection using microwaves, infrared waves, radio waves, spread spectrum technologies, satellites, etc. The transceiver 315 can be configured to communicate with another device using cellular networks, local area networks, wide area networks, the Internet, etc. In some embodiments, one or more of the elements of the computing device 300 communicate via wired or wireless communications. In some embodiments, the transceiver 315 provides an interface for presenting information from the computing device 300 to external systems, users, or memory. For example, the transceiver 315 may include an interface to a display, a printer, a speaker, etc. In an illustrative embodiment, the transceiver 315 may also include alarm/indicator lights, a network interface, a disk drive, a computer memory device, etc. In an illustrative embodiment, the transceiver 315 can receive information from external systems, users, memory, etc.

In an illustrative embodiment, the user interface 320 is configured to receive and/or provide information from/to a user. The user interface 320 can be any suitable user interface. The user interface 320 can be an interface for receiving user input and/or machine instructions for entry into the computing device 300. The user interface 320 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into the computing device 300. The user interface 320 can be used to navigate menus, adjust options, adjust settings, adjust display, etc.

The user interface 320 can be configured to provide an interface for presenting information from the computing device 300 to external systems, users, memory, etc. For example, the user interface 320 can include an interface for a display, a printer, a speaker, alarm/indicator lights, a network interface, a disk drive, a computer memory device, etc. The user interface 320 can include a color display, a cathode-ray tube (CRT), a liquid crystal display (LCD), a plasma display, an organic light-emitting diode (OLED) display, etc.

In an illustrative embodiment, the power source 325 is configured to provide electrical power to one or more elements of the computing device 300. In some embodiments, the power source 325 includes an alternating power source, such as available line voltage (e.g., 120 Volts alternating current at 60 Hertz in the United States). The power source 325 can include one or more transformers, rectifiers, etc. to convert electrical power into power useable by the one or more elements of the computing device 300, such as 1.5 Volts, 8 Volts, 12 Volts, 24 Volts, etc. The power source 325 can include one or more batteries.

In an illustrative embodiment, any of the operations described herein can be implemented at least in part as computer-readable instructions stored on a computer-readable memory. Upon execution of the computer-readable instructions by a processor, the computer-readable instructions can cause a computing system to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A computing device comprising:
   a memory; and a processor operatively coupled to the memory and configured to:
   access a first event code and a plurality of first entry codes;
   derive a plurality of first translated event codes based on the first event code;
   determine that the plurality of first translated event codes were successfully derived; and
   in response to the determination that the plurality of first translated event codes were successfully derived, store in a first journal entry of a database the first event code, the plurality of first translated event codes, the plurality of first entry codes, and an indication that the plurality of first translated event codes were successfully derived, wherein to store the first journal entry the processor is further configured to:
   determine that the first event code corresponds to an independent event; and
   store the first journal entry within the database such that the first journal entry is configured to be read from the database before a dependent event associated with the first event code;
   derive a plurality of first translated entry codes for each of the plurality of first entry codes, wherein deriving the plurality of first translated entry codes comprises cross-referencing each of the plurality of first entry codes in a look-up table, and wherein the look-up table indicates a relationship between each of the plurality of first entry codes and a respective translated entry code.

2. The computing device of claim 1, the processor further configured to: determine that one of the plurality of first entry codes was not successfully derived; and in response to the determination that the one of the plurality of first entry codes was not successfully derived, store in the first journal entry of the database an indication that the plurality of first translated entry codes were not successfully derived.

3. The computing device of claim 2, wherein the indication that the plurality of first translated entry codes were not successfully derived includes an indication of which one of the plurality of first entry codes were not successfully derived.

4. The computing device of claim 1, wherein each of the plurality of first translated event codes correspond to an event code that is readable via a different computing system.

5. The computing device of claim 1, wherein each of the plurality of first entry codes identify a field of information associated with the respective first entry code.

6. The computing device of claim 1, wherein the processor is further configured to store in the database a first timestamp indicating a time associated with the first event code.

7. The computing device of claim 1, wherein the processor is further configured to:
   receive an indication that a one or more events are ready for processing; and
   in response to receiving the indication, accessing the first event code and the plurality of first entry codes.

8. The computing device of claim 1, wherein the processor is further configured to:
   receive an indication that a one or more events are ready for processing; and
   in response to receiving the indication, accessing the first event code and the plurality of first entry codes.

9. The computing device of claim 1, wherein the first journal entry further comprises an indication that that the first journal entry corresponds to the independent event.

10. A non-transitory computer-readable medium having computer-readable instructions stored thereon that, upon execution by a processor, cause a device to perform operations, wherein the instructions comprise:
    instructions to access, from a first database, a first event code, a plurality of first entry codes, and first information associated with each of the plurality of first entry codes, wherein the first database, the first event code, the plurality of first entry codes, and the first information are associated with a first event;
    instructions to derive a plurality of first translated event codes based on the first event code;
    instructions to determine that the plurality of first translated event codes were successfully derived;
    instructions to determine that the first event code corresponds to an independent event;
    instructions to store in a first journal entry of a second database the first event code, the plurality of first translated event codes, the plurality of first entry codes, and an indication that the plurality of first translated event codes were successfully derived;
    wherein the instructions to store the first journal entry further comprise instructions to position the first journal entry within the second database such that the first journal entry is configured to be read from the second database before a dependent event associated with the first event; and
    wherein the instructions to derive the plurality of first translated event codes comprise instructions to identify the first event code in a look-up table, and wherein the look-up table indicates a relationship between the first event code and respective translated event codes.

11. The non-transitory computer-readable medium of claim 10, wherein each of the plurality of first translated event codes is readable by a respective computing system.

12. The non-transitory computer-readable medium of claim 10, further comprising derive a plurality of first translated entry codes for each of the plurality of first entry codes, wherein deriving the plurality of first translated entry codes comprises identifying each of the plurality of first translated entry codes in a look-up table, and wherein the look-up table indicates a relationship between each of the plurality of first entry codes and a respective translated entry code.

13. The non-transitory computer-readable medium of claim 12, wherein each of the plurality of first translated entry codes is configured to be readable by a respective computing system.

14. The non-transitory computer-readable medium of claim 10, wherein the first journal entry further comprises a timestamp associated with the first event.

15. The non-transitory computer-readable medium of claim 10, wherein the first journal entry further comprises an indication that that the first journal entry corresponds to the independent event.

16. A computer-implemented method comprising:
receiving a first event code, a plurality of first entry codes, and first information associated with each of the plurality of first entry codes, wherein the first event code, the plurality of first entry codes, and the first information are associated with a first event;
determining a plurality of first translated event codes based on the first event code, wherein each of the plurality of first translated event codes correspond to a readable code for the first event by pre-defined respective computing systems;
determining that the first event code corresponds to an independent event; and
storing in a first journal entry in a database the first event code, the plurality of first translated event codes, the plurality of first entry codes, and an indication that the first journal entry corresponds to the independent event;
derive a plurality of first translated entry codes for each of the plurality of first entry codes, wherein deriving the plurality of first translated entry codes comprises cross-referencing each of the plurality of first entry codes in a look-up table, and wherein the look-up table indicates a relationship between each of the plurality of first entry codes and a respective translated entry code; and
wherein storing the first journal entry comprises positioning the first journal entry within the database such that the first journal entry is configured to be read from the database before a dependent event corresponding to the first event.

17. The method of claim 16, further comprising determining a plurality of first translated entry codes for each of the plurality of first entry codes, and storing the plurality of first translated entry codes with the first journal entry.

18. The method of claim 17, further comprising determining that the plurality of first translated entry codes were successfully derived; and storing an indication that the plurality of first translated entry codes were successfully derived with the first journal entry.

\* \* \* \* \*